United States Patent
Loukianov

(10) Patent No.: US 12,231,529 B2
(45) Date of Patent: Feb. 18, 2025

(54) TIME-SENSITIVE MULTIMEDIA ENDPOINT INTERFACE BRIDGING THROUGH ETHERNET TRANSPORT

(71) Applicant: Avago Technologies International Sales Pte. Limited., Singapore (SG)

(72) Inventor: Dmitrii Loukianov, Chandler, AZ (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 253 days.

(21) Appl. No.: 17/706,323

(22) Filed: Mar. 28, 2022

(65) Prior Publication Data
US 2023/0308255 A1 Sep. 28, 2023

(51) Int. Cl.
*H04L 7/00* (2006.01)

(52) U.S. Cl.
CPC .................................. *H04L 7/0033* (2013.01)

(58) Field of Classification Search
CPC ..................................................... H04L 7/0033
See application file for complete search history.

(56) References Cited

U.S. PATENT DOCUMENTS

| | | | |
|---|---|---|---|
| 9,563,582 B2 | 2/2017 | Glaros | |
| 10,742,733 B2 * | 8/2020 | Scurrell | H04W 4/80 |
| 10,762,013 B2 * | 9/2020 | Mallela | G06F 13/32 |
| 11,089,140 B2 | 8/2021 | Lee | |
| 11,259,058 B2 * | 2/2022 | Goldrei | H04N 21/23418 |
| 11,720,520 B2 * | 8/2023 | Kelm | G06F 13/4295 |
| | | | 710/105 |
| 2011/0231565 A1 | 9/2011 | Gelter et al. | |
| 2016/0182176 A1 | 6/2016 | Ramachandra | |
| 2019/0030687 A1 | 10/2019 | Kniplitsch et al. | |
| 2019/0324450 A1 | 10/2019 | Lurie et al. | |

(Continued)

OTHER PUBLICATIONS

Extended European Search Report, EP Application No. 23163008.8, European Patent Office, report dated Aug. 25, 2023, 10 pages.

(Continued)

*Primary Examiner* — Chandrahas B Patel
(74) *Attorney, Agent, or Firm* — Quarles & Brady LLP

(57) ABSTRACT

An Ethernet bridge architecture enables timing replication. The Ethernet bridge receives data packets from a sensor (such as a video sensor) and immediately tags each data packet with a transmitter timecode. The tagged data packets are then forwarded to the appropriate receiver over the digital data network or link that may exhibit packet delivery time variations and reordering. The receiver identifies data packets including the local timecode and delays processing (display) of the data packet until a timecode local to the receiving node matches the transmitter timecode plus some delay. The receiver also restores the original order of the packets by observing packet sequence number and placing them at appropriate location in memory buffer. By delaying processing, the Ethernet bridge compensates for any variance in network latency. The delay should be greater than a worst-case delay as defined by the network architecture. The Ethernet bridge allows a distributed multi-camera and multi-display system based on high-bandwidth Ethernet infrastructure, while still using non-Ethernet sensors, displays, and application processors.

19 Claims, 5 Drawing Sheets

(56) References Cited

U.S. PATENT DOCUMENTS

2021/0109881 A1    4/2021  Moustafa et al.

OTHER PUBLICATIONS

Saar, Hezi, "Powering Imaging Applications with MIPI CSI-2?, mipr DEVCON, 2017 MIPI Alliance Developers Conference,"URL: https://www.mipi.org/sites/default/files/Hsinchu-Synopsys-Powering-Imaging-Applications-with-MIPI-CSI-2.pdf, Downloaded Dec. 17, 2021, 24 pages.

Texas Instruments, "TI Automotive Interface Solution", Jul. 23, 2019, URL: https://www.ti.com/seclit/ml/sszp282/sszp282.pdf, 87 pages.

* cited by examiner

TIME-SENSITIVE MULTIMEDIA ENDPOINT INTERFACE BRIDGING THROUGH ETHERNET TRANSPORT

BACKGROUND

High-speed data links and the availability of switches and other infrastructure devices enable the transfer of uncompressed pixel data between video endpoints (image sensors and displays) and the host processors which consume or generate such data. However, the attachment of such sensors to high-speed Ethernet currently requires several off-the-shelf components containing MAC, PHY, microcontroller, and some logic to implement a bridge between traditional image sensors and Ethernet on the transmit side. The logic may be implemented in field programmable gate arrays (FPGA). This solution is expensive and power hungry, and thus impractical for volume deployment. On the receive side, there is no image signal processor that can be directly attached to Ethernet, and many available components are designed to directly interface to sensors through an application specific interface. For camera applications these are Mobile Industry Processor Interface (MIPI) camera serial interface (CSI) interfaces. For displays these are HDMI, VESA, OpenLDI and MIPI DSI interfaces. A non-integrated Ethernet bridge, if implemented, would require PHY, MAC and logic which again are expensive.

Ethernet-based video transport could become practical if a highly integrated, dedicated bridge between sensors and display interfaces and Ethernet cabling were available. However, the problem of data fragmentation, encapsulation in network packets, de-capsulation, reordering and timing recovery on the receiving end must still be solved, especially if such bridge must be functionally invisible to the application, i.e. the sensor interface signals and timing were truly replicated on the image signal processor side.

SUMMARY

In one aspect, embodiments of the inventive concepts disclosed herein are directed to an Ethernet bridge architecture with timing replication. The Ethernet bridge receives data packets from a sensor (such as a video sensor) and immediately tags each data packet with a transmitter timecode. The tagged data packets are then forwarded to the appropriate receiver. The receiver identifies data packets including the local timecode and delays processing (display) of the data packet until a timecode local to the receiving node matches the transmitter timecode plus some delay. By delaying processing, the Ethernet bridge compensates for any variance in network latency. In a further aspect, the delay is greater than a worst-case delay as defined by the network architecture.

The Ethernet bridge allows a distributed multi-camera and multi-display system based on high-bandwidth Ethernet infrastructure, while still using non-Ethernet sensors, displays, and application processors.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
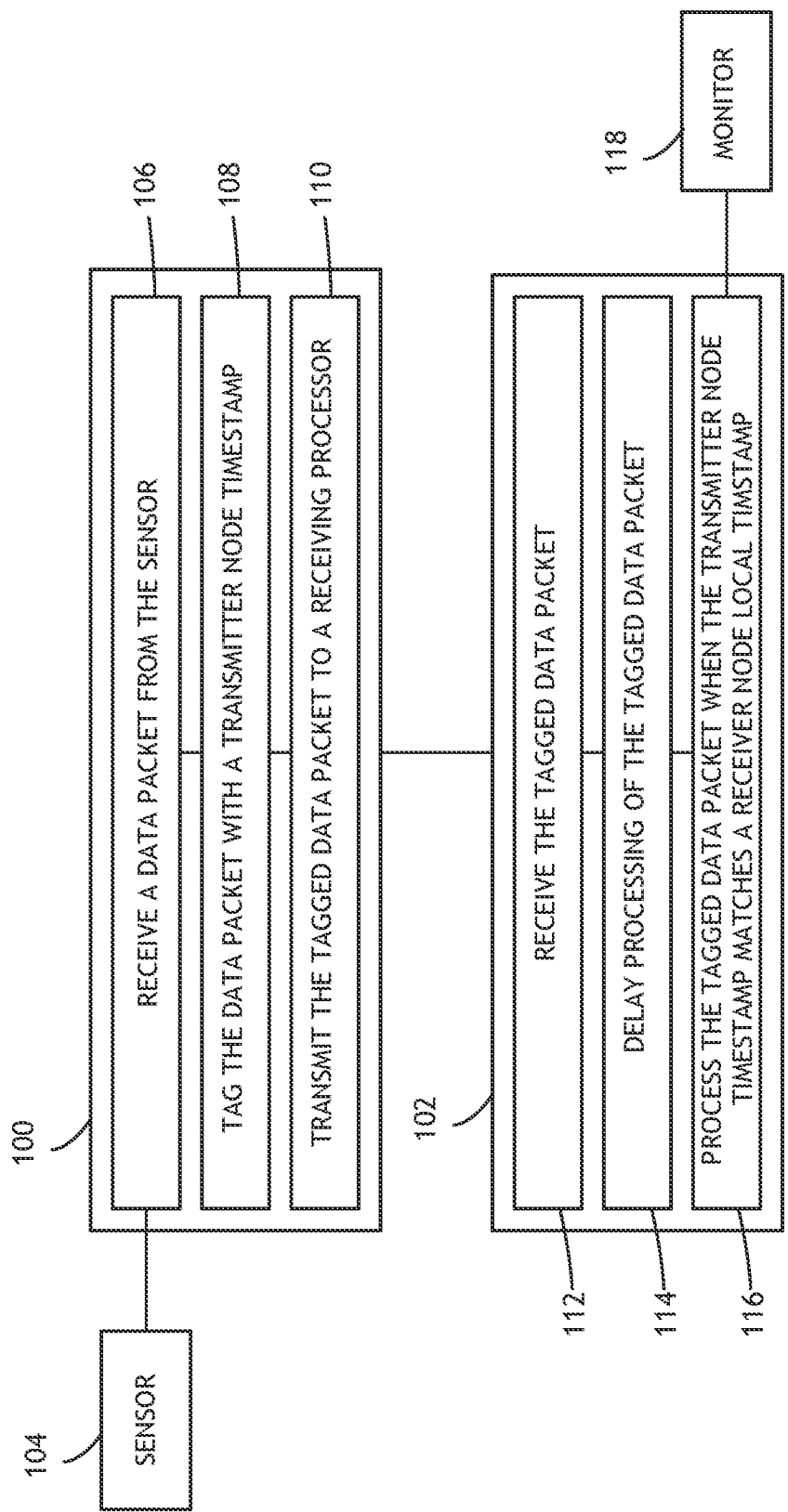
FIG. 1 shows a block diagram of a system according to an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described. It may be appreciated that "data communication" refers to both direct and indirect data communication (e.g., there may be intervening components).

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to an Ethernet bridge architecture with true timing relationship replication. The Ethernet bridge receives data packets from a sensor (such as a video sensor) and immediately tags each data packet with a transmitter timecode. The tagged data packets are then forwarded to the appropriate receiver. The receiver identifies data packets including the local timecode and delays processing (display) of the data packet until a timecode local to the receiving node matches the transmitter timecode plus some delay. By delaying processing, the Ethernet bridge compensates for any variance in network latency. The delay may be greater than a worst-case delay as defined by the network architecture. The Ethernet bridge allows a distributed multi-camera and multi-display system based on high-bandwidth Ethernet infrastructure, while still using non-Ethernet sensors, displays, and application processors.

Referring to FIG. 1, a block diagram of a system according to an exemplary embodiment is shown. The system includes a transmitting or source node 100 and a receiving or sink node 102. The transmitting node 100 (such as a network connected camera, microphone or other audio sensor, or the like) receives 106 data packets from a sensor 104 such as a video sensor, audio sensor, or the like, and tags 108 each data packet with a timecode local to the transmitting node. The transmitting node 100 then transmits 110 the tagged data packets to the receiving node 102 (such as a display, an audio monitor, an application utilizing the tagged data packets for data processing, or the like).

The receiving node 102 receives 112 the tagged data packets, identifies the timecodes in the data packets, compares them to a timecode local to the receiving node 102, and delays 114 processing (for example, display) of the data packets. When a data packet timecode plus some predefined delay matches the timecode local to the receiver, the receiving node 102 processes 116 that data packet; for example, displaying it on a monitor 118.

It may be appreciated that each of the transmitting node 100 and receiving node 102 includes a processor for performing the steps described herein (a transmitting node processor and receiving node processor respectively). Within the context of the present disclosure, "processor" may refer to a specialty processor hard wired for the described purposes, a general-purpose programmable central processing unit (CPU), a field programmable gate array, microprocessor, microcontroller, embedded processor, digital signal processor, and other such data processing technology. Where the processor comprises a device configurable by software or firmware, such software or firmware may be embodied in a non-transitory memory; such memory may employ PROM, EPROM, EEPROM, flash memory, dynamic random-access memory, or the like. The controller 600 is configured to perform certain process steps 606, 608, 610, 612 as more fully described herein.

Where the network connection between the transmitting node 100 and the receiving node 102 imposes some level of latency, embodiments of the present disclosure ensure that variable latency of packet delivery does not impact the timing recovery and synchronization of conventional displays at the receiving node 102. In at least one embodiment, where the network has some known worst case delay, the predefined delay may be defined to be greater than that worst case delay.

Figure 2:
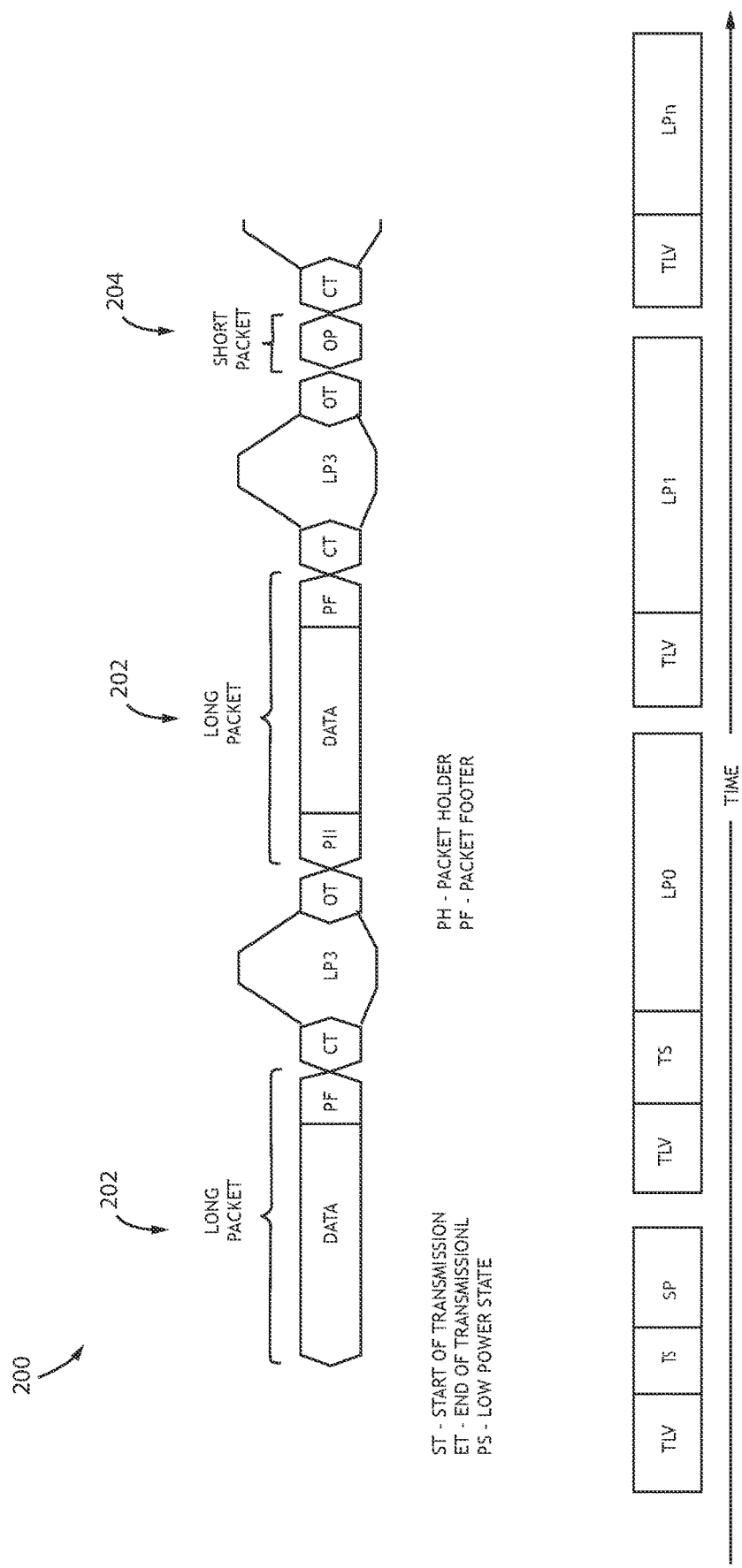
FIG. 2 shows a block diagram of data packets according to an exemplary embodiment.

Referring to FIG. 2, a structure of data packets stream 200 according to an exemplary embodiment is shown. In at least one embodiment, data packets 200 comprise a MIPI CSI data stream, including long packets 202 of less time-critical pixel data, and short packets 204 carrying time-sensitive synchronization events. A single virtual channel packet stream on MIPI CSI port is shown in FIG. 2 containing a mix of short packets 204 and long packets 202. The ingress port should record timecodes on arrival of time critical short packets 204. When timecodes are captured, the corresponding short packets 204 are sent over the network connection together with corresponding timecode. Any suitable method of encapsulation may be used; in at least one embodiment, tuples of {Type, Length, Value} are used as a descriptor of a following data payload, which is relatively easy to parse in hardware.

While specific, exemplary embodiments refer to CSI, it should be appreciated that the concepts described herein are applicable to other interfaces. Such interfaces may include, but are not limited to, video serial or parallel interface, audio interface, USB interface with isochronous traffic, etc. Furthermore, while specific, exemplary embodiments refer to video streams, the inventive concepts are equally applicable to any stream where data packet delivery is time sensitive, including video, audio, time-sensitive control events, etc.

If the long packets do not fit into a single Ethernet network transport packet, they may be fragmented into a plurality of smaller packets, each containing the sequence number and data payload. The packets may be reordered during propagation through network links, which may also contribute to delivery time variance. The order of the payload may be reconstructed on a receiving node by observing sequence numbers and placing the data payload into a receiving buffer at the appropriate locations. Reordering restores the original order of the data payload in long packets.

In at least one embodiment (such as MIPI CSI), short packets 204 comprise four bytes, and carry stream ID. The short packet's appearance time represents the time when the pixel data was captured, and is used to synchronize processing and display. Long packets 202 can carry up to 64 k bytes and carry bulk pixel data. In at least one embodiment, data packets 202, 204 use stream ID to represent virtual channels and allow data streams with different origins to be interleaved.

When a MIPI CSI interface is used in vision and ADAS applications, the sensor timing is represented by the temporal location of the vertical and horizontal synchronization signals, and the temporal locations of corresponding FSYN and LSIN short packets 204 in the MIPI CSI data stream. Hardware detects the arrival time of these short packets 204 and relates them to a shared timebase by recording a local timecode and producing a presentation timestamp (PTS).

The timecode is transferred to the receiving end in the video element data packet, and then used by the receiver's output interface to create a corresponding FSIN and LSYN packet at a receiver side time which is equal to the original PTS plus some delay. The delay may be greater than all possible delays in the network transport, including the delays in the MACs and PHYs in network interfaces, transport delays, and packet forwarding delays in the network switches and bridges. The same method may be used in multi-stream mode, where independent streams are distinguished by a corresponding virtual channel identifier in Ethernet packets and use independent timestamps for packets belonging to different virtual channels.

Figure 3:
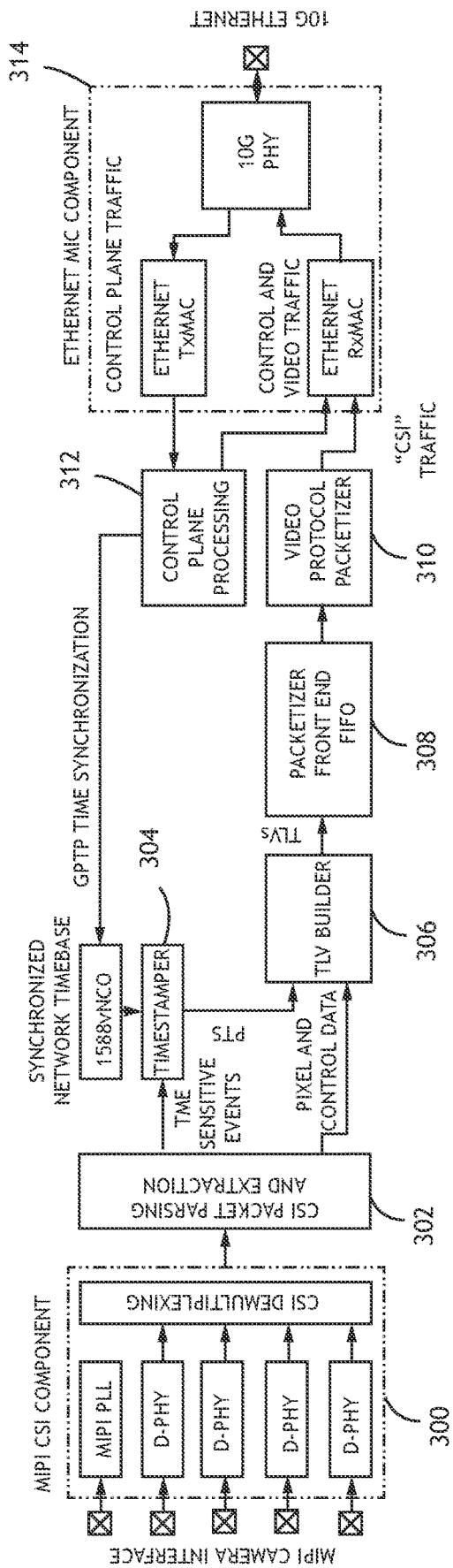
FIG. 3 shows a block diagram of a system for timecoding and transmitting data packets according to an exemplary embodiment.

Referring to FIG. 3, a block diagram of a possible system for timecoding and transmitting data packets according to an exemplary embodiment is shown. A MIPI CSI interface component 300 captures a data stream including video data, or the like. It may be appreciated that a MIPI CSI interface component 300 may comprise any device with a CSI interface, including CSI-1, CSI-2, CSI-3, etc. The MIPI CSI stream is inspected by a CSI packet parser 302 that detects the arrival of time-sensitive short packets and signals. When the CSI packet parser detects time-sensitive short packets, a time-stamper 304 immediately records the local timecode. Recording the local timecode may comprise sampling a synchronized network timebase as defined by IEEE 1588 virtual NCO and tick counter, or other such network time synchronization protocol. This sample will become the presentation timestamp (PTS) for the corresponding data packet. A type length value (TLV) builder 306 receives the data stream from CSI packet parser 302, including pixel and control data, and the timecode from the time sampler 304.

The timecoded packet stream is sent from the TLV builder 306 to a packetizer FIFO 308 for elastic buffering, and then passed on to the video protocol packetizer 310. The video protocol packetizer 310 builds Ethernet packets according to a desired transport protocol. The video protocol packetizer 310 sends the created video stream packets to an Ethernet transmit component 314. The Ethernet transmit component 314 may include an Ethernet Physical interface (PHY) and media access controller (MAC) configured to arbitrate between video packets and control plane packets from a control plane processing element 312, sent between source and sink nodes and used for remote control and status communication. The Ethernet MAC may implement enhancements like credit-based or leaking bucket traffic shaping.

Figure 4:
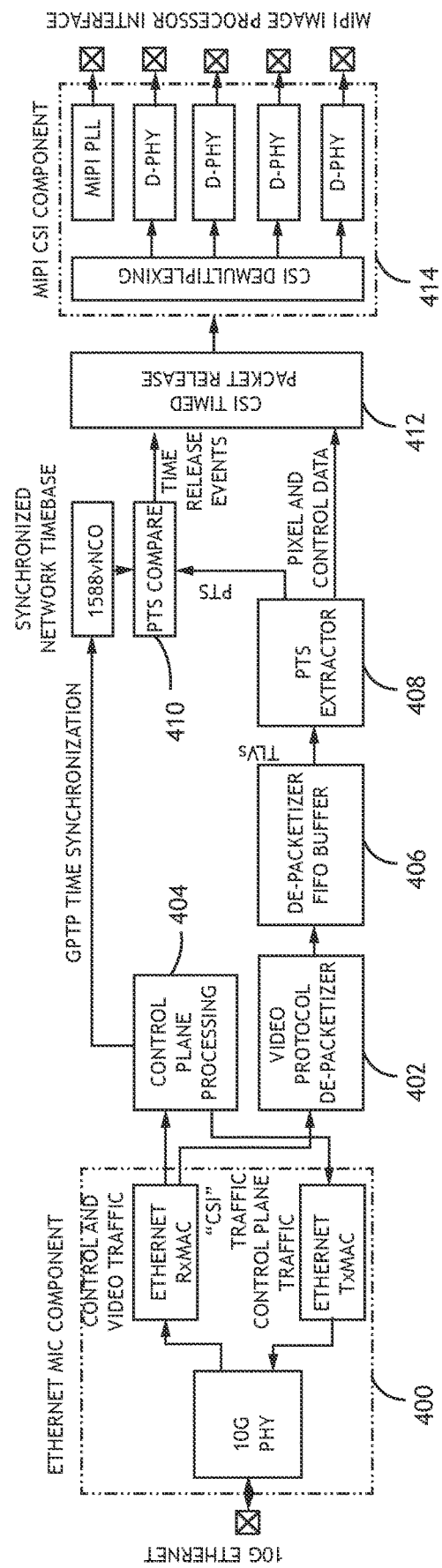
FIG. 4 shows a block diagram of a system for receiving and processing data packets according to an exemplary embodiment.

Referring to FIG. 4, a block diagram of a system for receiving and processing data packets according to an exemplary embodiment is shown. A receiving node receives the packets from the network via an Ethernet component 400 and directs video stream packets to a depacketizer 402 and then to the de-packetizer FIFO buffer 406. The data packets include the TLV structure containing the timecode captured when the data packet appeared on the transmitter node. A PTS extractor 408 extracts the timecode from each data packet and delivers it to a PTS comparator 410; the PTS extractor 408 also delivers pixel and control data to a packet release element 412. In at least one embodiment, the PTS extractor 408 may add a predefined delay to the timecode.

The PTS comparator 410 continuously compares the timecode with predefined delay to a synchronized network timebase. When the synchronized network timebase equals the timecode plus predefined delay, the PTS comparator 410 signals the packet release element 412 to feed the pixel and control data to a MIPI CSI interface component 414, such as an Image Signal Processor (ISP) or display device. The signals on MIPI CSI interface 414 replicate the input timing from the transmitting node, but with an added fixed delay.

Because the delay is constant for all MIPI packets, and the timebases are synchronized between receiver and transmitter nodes, the time relationships between short packets carrying frame start and line start signals is identical to that of the originating sensor, so the application processor may use them to recover the line rate, frame rate and other video-related clocks at the receiving node. Ethernet also provides a bidirectional communication channel for control plane 404 messages used for remote node management and time synchronization.

Figure 5:
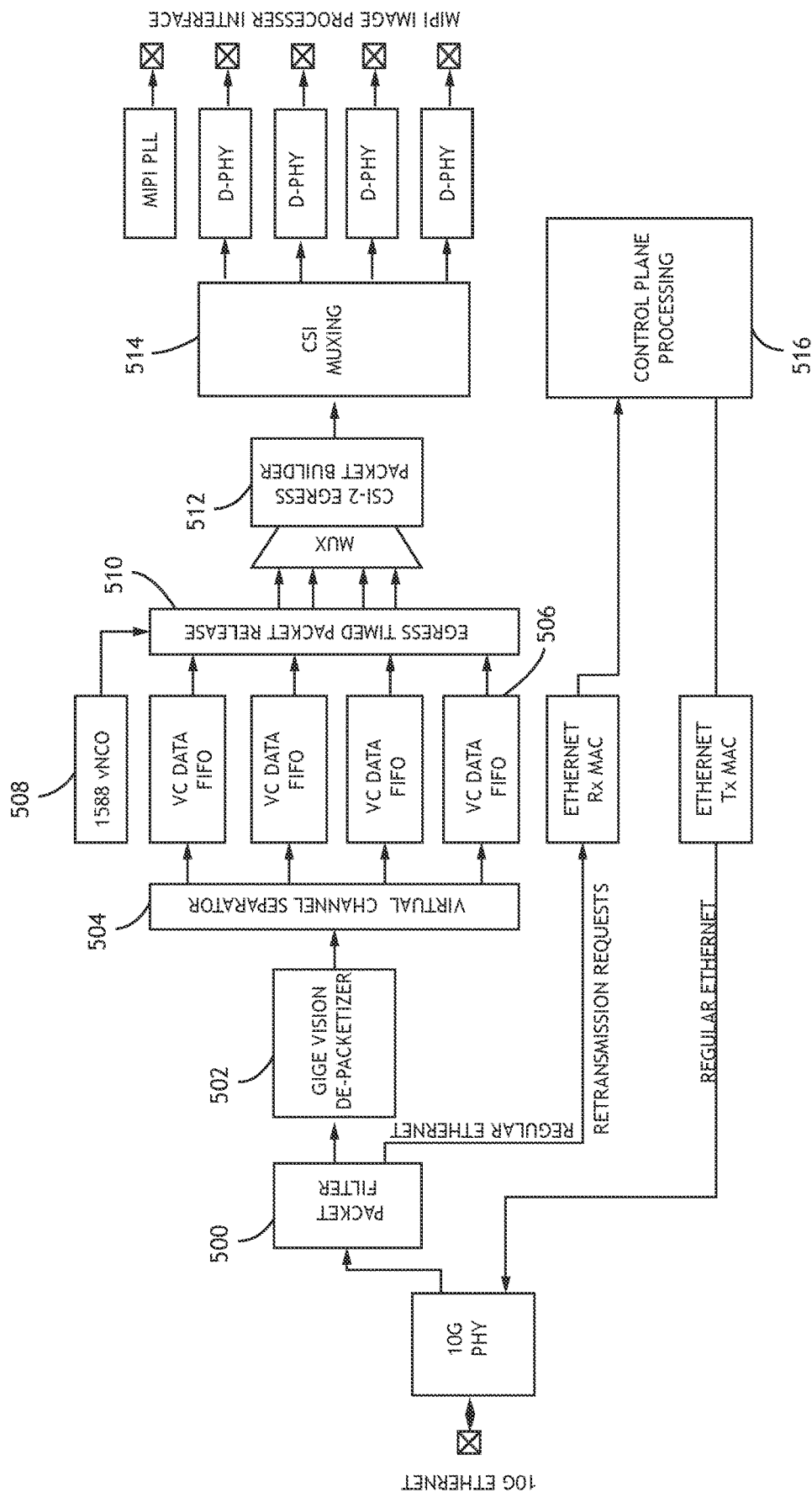
FIG. 5 shows a block diagram of a system for transmitting and receiving data packets in a plurality of virtual channels according to an exemplary embodiment.

Referring to FIG. 5, a block diagram of a system for transmitting and receiving data packets in a plurality of virtual channels according to an exemplary embodiment is shown. The principles described herein may be extended to receive streams from multiple virtual channels on one or more transmitter nodes and direct them into the output interface as interleaved MIPI CSI packets. The packets are received by a packet filter 500 that identifies data packets requiring timecode synchronization and forwards those data packets to a depacketizer 502. Data streams are then assigned to virtual channel FIFO buffers 506 by a virtual channel separator 504. Each virtual channel data stream is then released via a packet release element 510. The packet release element 510 compares timecodes in each data stream to a synchronized network timebase 508, including some predefined delay, and releases the corresponding data to a multiplexer and packet builder 512. The resulting data packets are then delivered to a CSI multiplexing element 514 for release to the corresponding processing interface (such as MIPI image processing interface).

It may be appreciated that, within the context of the present disclosure, "virtual channel" refers to a data connection architecture between a transmitting node and a receiving node where a single physical channel such as an Ethernet connection supports multiple independent logical connections, such as via separate data port definitions. Alternatively, or in addition, virtual channels may defined by multiple, different data connections between the transmitting node and the receiving node.

In at least one embodiment, the packet release element 510 may determine that more than one data stream should be released simultaneously; that is to say, the timecode plus delay is the same for data in more than one virtual channel FIFO buffer 506. In that case, packets may be released with a suitable arbitration scheme. For example, round-robin arbitration may be used.

Embodiments of the present disclosure enable a method to maintain a common time reference from an image sensor to a network connected display, useful for industrial machine vision, studio production, or ADAS automotive technologies. A network connected device detects and measures time-critical events on the transmitter side, transfers the desired time reference together with data to the receiving end, and delays the release of the time-sensitive data on the receiving side until an original timecode plus a predefined delay, which may be greater than all worst-case possible transport delays in the Ethernet infrastructure.

Embodiments may benefit from Ethernet's ability to scale through the use of switches interconnected through potentially different speed links, broadcast and multicast streams for consumption by more than one receiver, and aggregate and interleave multiple independent data streams from multiple sources for transporting on a common wire segment. Routing between the sources and sink endpoints may depend on the application and state of the system, and may be dynamically changed as needed during vehicle operation. Conversely, the display interface on the application processor must be replicated on the remote display's Ethernet bridge, including its timing, because display panels use the timing to synchronize internal circuits.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. A method of synchronizing signals comprising:
   receiving a data packet via a transmitting node processor;
   recording a timecode local to the transmitting node;
   tagging the data packet with the timecode local to the transmitting node;
   transmitting the data packet to a receiving node;
   receiving the data packet via a receiving node processor;
   delaying processing the data packet until a timecode local to the receiving node matches the timecode local to the transmitting node plus a delay;
   processing the data packet when the timecode local to the receiving node matches the timecode local to the transmitting node plus the delay; and
   defining a plurality of virtual channels carrying independent data streams;
   releasing data in the corresponding virtual channel to an interface at a time matching the timecode local to the transmitting node in the tagged data packet plus a delay.

2. The method of claim 1, wherein the timecode local to the transmitting node and timecode local to the receiving node are synchronized via a network time synchronization protocol.

3. The method of claim 1, wherein the data packet comprises a short synchronization camera serial interface (CSI) data packet.

4. The method of claim 1, further comprising:
   for each of the plurality of virtual channels, independently performing the steps of:
   receiving a data packet via the transmitting node processor;
   recording a timecode local to the transmitting node;
   tagging the data packet with the timecode local to the transmitting node; and
   transmitting the data packet to the receiving node.

5. The method of claim 4, further comprising:
   determining, for each of the plurality of virtual channels, when the timecode local to the receiving node matches the timecode local to the transmitting node in the tagged data packet plus a delay.

6. The method of claim 1, wherein the delay is greater than a worst-case delay as defined by a network architecture.

7. A node in a network comprising:
   at least one processor configured to:
   receive a data packet from a sensor in data communication with the at least one processor;
   record a timecode local to the transmitting node;
   tag the data packet with the local timecode; and
   transmit the data packet to a receiving node;
   define a plurality of virtual channels;
   for each of the plurality of virtual channels, the at least one processor is configured to:
   receive a data packet from the sensor;
   record a timecode local to the transmitting node;
   tag the data packet with the timecode local to the transmitting node.

8. The node of claim 7, wherein the at least one processor is further configured to:
   receive a data packet from a transmitting node;
   identify a timecode local to the transmitting node tag in the data packet;
   delay processing the data packet until a timecode local to the receiving node matches the timecode local to the transmitting node plus a delay; and
   process the data packet when the timecode local to the receiving node matches the timecode local to the transmitting node plus the delay.

9. The node of claim 8, wherein the timecode local to the transmitting node and timecode local to the receiving node are synchronized via a network time synchronization protocol.

10. The node of claim 8, wherein the delay is greater than a worst-case delay as defined by a network architecture.

11. The node of claim 7, wherein the sensor comprises a device with a CSI interface.

12. The node of claim 7, wherein:
    for each of the plurality of virtual channels, the at least one processor is configured to:
    transmit the data packet to the receiving node.

13. The node of claim 12, wherein the at least one processor is further configured to:
    determine, for each of the plurality of virtual channels, if the timecode local to the receiving node matches the timecode local to the transmitting node plus a delay; and
    release data in the corresponding virtual channel to an interface.

14. An apparatus comprising:
    a depacketizer configured to receive a sensor data packet;
    a time-stamper configured to record a local timecode, the time-stamper being configured to record the local timecode every time a data packet is received;
    a memory buffer configured to:
    receive the sensor data packet; and
    extract timecode data from the sensor data packet; and
    a packetizer configured to:
    receive sensor data packet data from the memory buffer;
    discard the recorded local timecode if the data packet is determined to be a long packet;
    generate a new data packet from the sensor data packet data and the local timecode; and
    send the new data packet to a receiving node.

15. The apparatus of claim 14, wherein:
    the depacketizer is configured to:
    receive a data packet from a transmitting node; and
    depacketize and reorder data in the data packet from the transmitting node to restore an original order;
    further comprising:
    a timestamp extractor configured to extract a timecode from the data packet;
    a timestamp comparator configured to compare the data packet timecode to a receiver timecode local to the computer apparatus; and a packet release element configured to perform a local-to-network synchronization based on the data packet timecode to replicate event timing from a transmitting node.

16. The apparatus of claim 15, wherein the data packet timecode and receiver timecode are synchronized via a network time synchronization protocol.

17. The apparatus of claim 15, wherein the packet release element is further configured to add a delay to the data packet timecode.

18. The apparatus of claim 17, wherein the delay is greater than a worst-case delay as defined by a network architecture.

19. The apparatus of claim 15, wherein:
a control plane processor is configured to define a plurality of virtual channels; and
for each of the plurality of virtual channels:
  the depacketizer receives a sensor data packet;
  the time-stamper records a local timecode; and
  the packetizer:
    generates a new data pack based on the local timecode; and
    sends the new packet to a receiving node.

* * * * *